(12) United States Patent
Goldner et al.

(10) Patent No.: US 9,797,755 B2
(45) Date of Patent: Oct. 24, 2017

(54) DAMPED FIBER OPTIC ACCELEROMETERS, SENSORS, AND SENSOR ASSEMBLIES, AND METHODS OF ASSEMBLING THE SAME

(71) Applicant: Avalon Sciences, Ltd, Somerset (GB)

(72) Inventors: Eric Lee Goldner, Valencia, CA (US);
David B. Hall, La Crescenta, CA (US)

(73) Assignee: Avalon Sciences Ltd., Somerset (GB)

( * ) Notice: Subject to any disclaimer, the term of this patent is extended or adjusted under 35 U.S.C. 154(b) by 0 days.

(21) Appl. No.: 15/595,315

(22) Filed: May 15, 2017

(65) Prior Publication Data

US 2017/0248447 A1 Aug. 31, 2017

Related U.S. Application Data

(62) Division of application No. 14/744,866, filed on Jun. 19, 2015, now Pat. No. 9,684,012.

(60) Provisional application No. 62/014,319, filed on Jun. 19, 2014.

(51) Int. Cl.
| | |
|---|---|
| *G01P 15/093* | (2006.01) |
| *G01D 5/353* | (2006.01) |
| *G01D 5/26* | (2006.01) |
| *F16F 9/32* | (2006.01) |
| *F16F 9/00* | (2006.01) |
| *G01P 15/08* | (2006.01) |

(52) U.S. Cl.
CPC ......... *G01D 5/35335* (2013.01); *F16F 9/006* (2013.01); *F16F 9/3292* (2013.01); *G01D 5/268* (2013.01); *G01D 5/3537* (2013.01); *G01P 15/093* (2013.01); *B32B 2262/0207* (2013.01); *G01P 2015/0882* (2013.01)

(58) Field of Classification Search
CPC ........................ G01P 2015/0882; G01P 15/093
See application file for complete search history.

(56) References Cited

U.S. PATENT DOCUMENTS

| | | | |
|---|---|---|---|
| 6,473,183 B1 | 10/2002 | Tweedy et al. | |
| 7,683,312 B2 | 3/2010 | Goldner et al. | |
| 7,999,946 B2 | 8/2011 | Andersen et al. | |
| 8,276,446 B2* | 10/2012 | Ulm et al. ............ | B81B 7/0012 |
| | | | 73/430 |
| 8,401,354 B2 | 3/2013 | Goldner et al. | |
| 8,701,481 B2 | 4/2014 | Andersen et al. | |
| 8,816,570 B1* | 8/2014 | McConnell ......... | G01P 15/0922 |
| | | | 310/331 |
| 8,983,287 B2 | 3/2015 | Goldner et al. | |
| 2012/0006109 A1 | 1/2012 | Andersen et al. | |

(Continued)

FOREIGN PATENT DOCUMENTS

WO 2015/034858 3/2015

*Primary Examiner* — John Capman, Jr.
(74) *Attorney, Agent, or Firm* — Stradley Ronon Stevens & Young, LLP (57) ABSTRACT

A fiber optic sensor is provided. The fiber optic sensor includes: a fixed portion configured to be secured to a body of interest; a moveable portion; a spring member positioned at least partially between the fixed portion and the moveable portion; an optical fiber wound in contact with the fixed portion and the moveable portion such that the optical fiber spans at least a portion of the spring; and an elastomeric material provided in contact with at least one of the fixed portion, the moveable portion, the spring member, the body of interest, and the optical fiber.

3 Claims, 11 Drawing Sheets

(56) References Cited

U.S. PATENT DOCUMENTS

| | | |
|---|---|---|
| 2012/0227504 A1 | 9/2012 | Goldner et al. |
| 2012/0257208 A1 | 10/2012 | Andersen et al. |
| 2012/0257209 A1 | 10/2012 | Andersen et al. |
| 2013/0025375 A1 | 1/2013 | Goldner et al. |
| 2013/0201484 A1 | 8/2013 | Goldner et al. |
| 2014/0105609 A1 | 4/2014 | Andersen et al. |
| 2014/0110124 A1 | 4/2014 | Goldner et al. |
| 2014/0231636 A1 | 8/2014 | Goldner et al. |
| 2014/0246210 A1 | 9/2014 | Andersen et al. |
| 2014/0334824 A1 | 11/2014 | Goldner |
| 2015/0086206 A1 | 3/2015 | Goldner et al. |
| 2015/0131103 A1 | 5/2015 | Goldner et al. |

* cited by examiner

DAMPED FIBER OPTIC ACCELEROMETERS, SENSORS, AND SENSOR ASSEMBLIES, AND METHODS OF ASSEMBLING THE SAME

RELATED APPLICATION

This application is a divisional of U.S. patent application Ser. No. 14/744,866, filed Jun. 19, 2015, which claims the benefit of priority to U.S. Provisional Patent Application Ser. No. 62/014,319, filed on Jun. 19, 2014, the contents of which are incorporated in this application by reference.

FIELD

The present invention relates to the fiber optic sensing, and more particularly, to fiber optic sensors with improved damping characteristics.

BACKGROUND

Fiber optic accelerometers are typically resonant devices in that they have a high quality factor ('Q') frequency response which can limit the dynamic range when mechanical inputs are broadband and span the natural frequency of the accelerometer. While a desirable a fiber optic sensor has a constant frequency response, in practice the frequency response may have a highly variable magnitude, resulting in a limited dynamic range.

Using exemplary aspects of the present invention, it would be desirable to reduce the variability of the frequency response of the fiber optic sensor, thereby improving both the dynamic range and the variability of the low frequency scale factor, and extending the useable bandwidth of the accelerometer to higher frequencies.

SUMMARY

According to an exemplary embodiment of the present invention, a fiber optic sensor is provided. The fiber optic sensor includes: a fixed portion configured to be secured to a body of interest; a moveable portion; a spring member positioned at least partially between the fixed portion and the moveable portion; an optical fiber wound in contact with the fixed portion and the moveable portion such that the optical fiber spans at least a portion of the spring; and an elastomeric material provided in contact with at least one of the fixed portion, the moveable portion, the spring member, the body of interest, and the optical fiber.

According to another exemplary embodiment of the present invention, a fiber optic sensor assembly is provided. The fiber optic sensor assembly includes: a fixed portion configured to be secured to a body of interest; a moveable portion; a spring member positioned at least partially between the fixed portion and the moveable portion; an optical fiber wound in contact with the fixed portion and the moveable portion such that the optical fiber spans at least a portion of the spring; an elastomeric material provided in contact with at least one of the fixed portion, the moveable portion, the spring member, the body of interest, and the optical fiber; and a housing configured to receive each of the fixed portion, the moveable portion, the spring member, the optical fiber, and the elastomeric material.

According to yet another exemplary embodiment of the present invention, a method of assembling a fiber optic sensor is provided. The method includes the steps of: (a) providing a fixed portion configured to be secured to a body of interest, a moveable portion, a spring member positioned at least partially between the fixed portion and the moveable portion, and an optical fiber wound in contact with the fixed portion and the moveable portion such that the optical fiber spans at least a portion of the spring; and (b) providing an elastomeric material to be in contact with at least one of the fixed portion, the moveable portion, the spring member, the body of interest, and the optical fiber. Step (b) may include, for example: (1) applying the elastomeric material as a fluid to be in contact with at least one of the at least one of the moveable portion and the spring member; (2) applying the elastomeric material as a fluid to surround each of the moveable portion and the spring; (3) providing the elastomeric material as at least one solid elastomeric element in contact with at least one of the at least one of the moveable portion and the spring; or (4) providing the elastomeric material as a plurality of solid elastomeric elements in contact with at least one of the at least one of the moveable portion and the spring, amongst other methods.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION

In accordance with certain exemplary embodiments of the present invention, an elastomeric (e.g., rubber like) material is provided in contact with (and in some cases surrounding) certain parts of a fiber optic sensor (e.g., a fiber optic accelerometer). For example, the elastomeric material may be applied as a fluid material (e.g., that may be cured, for example, with or without the application or heat, light or other energy) or as one or more solid elastomeric components.

In certain exemplary embodiments of the present invention, a moveable portion of an accelerometer (and/or a mass engaged with the moveable portion) and/or other portions of the accelerometer are "potted" or otherwise engaged with (e.g., in contact with) an elastomeric material in a way that reduces the magnitude of the peak response of the accelerometer, thereby significantly reducing the Q, and therefore improving both the dynamic range and the consistency of the low frequency scale factor (sensitivity) below resonance. For example, the elastomeric material may surround or be in contact with certain elements of the accelerometer to provide the desired damping function. Specific examples for use of the elastomeric material include: (1) the elastomeric material surrounding the entire accelerometer; (2) the elastomeric material surrounding one or more elements of the accelerometer, such as the moveable portion; (3) the elastomeric material in contact with one or more elements of the accelerometer, such as the moveable portion; (4) the elastomeric material being positioned between elements of the accelerometer, such as between the moveable portion and a mass engaged with the moveable portion, or between the moveable portion and a fixed portion, amongst other combinations; or (5) the elastomeric material partially or completely filling gaps between elements of the accelerometer such as between the moveable portion and a mass engaged with the moveable portion, or between the moveable portion and a fixed portion, amongst other combinations.

As used herein, the term elastomeric materials is intended to be broadly defined as a material selected from the group consisting of rubbers, neoprenes, urethanes, epoxies, silicones and viscoelastic materials. In certain exemplary embodiments of the present invention, the elastomeric material is a viscoelastic (lossy) material.

Figure 1A:
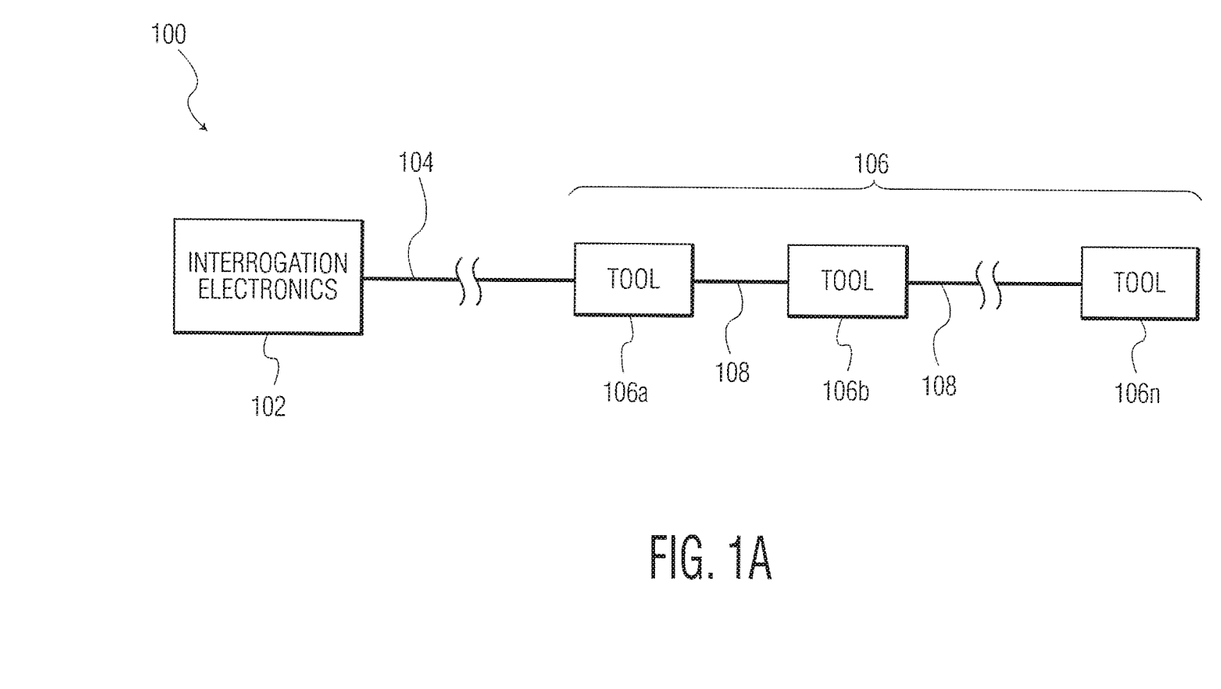
FIG. 1A is a block diagram of a fiber optic sensing system in accordance with an exemplary embodiment of the present invention.

FIG. 1A illustrates a fiber optic sensing system 100. Fiber optic sensing system 100 includes interrogation electronics 102, a lead cable 104, and a fiber optic sensor array 106. Fiber optic sensor array 106 includes a plurality of fiber optic sensing tools 106a, 106b, . . . , 106n. Interconnect fiber optic cable 108 is provided between fiber optic sensing tools 106a, 106b, . . . , 106n. Interrogation electronics 102 includes an optical source (e.g., a light source such as an LED, etc.) for providing light to fiber optic sensor array 106. The light is received back at interrogation electronics using an optical receiver. For example, each of the tools 106a, 106b, . . . , 106n includes one or more fiber optic sensors (e.g., accelerometers), where the sensors convert mechanical or physical motion (such as acceleration) to a change in the strain (e.g., longitudinal strain) in an optical fiber. At each of the sensors, the change in strain may then be converted to a change in the phase of light that passes through the optical fiber. Interrogation electronics 102 is able to analyze the change in the phase of light to determine information related to the application (e.g., environment) of the fiber optic sensor array such as, for example: vertical seismic profiling (VSP), three dimensional sub-surface mapping, microseismic monitoring, machine vibration monitoring, civil structure (e.g., dams, bridges, levees, buildings, etc.) monitoring, tunnel detection, perimeter/border security, earthquake monitoring, borehole leak detection, roadbed erosion, railbed erosion, pipeline monitoring, amongst other applications.

Figure 1B:
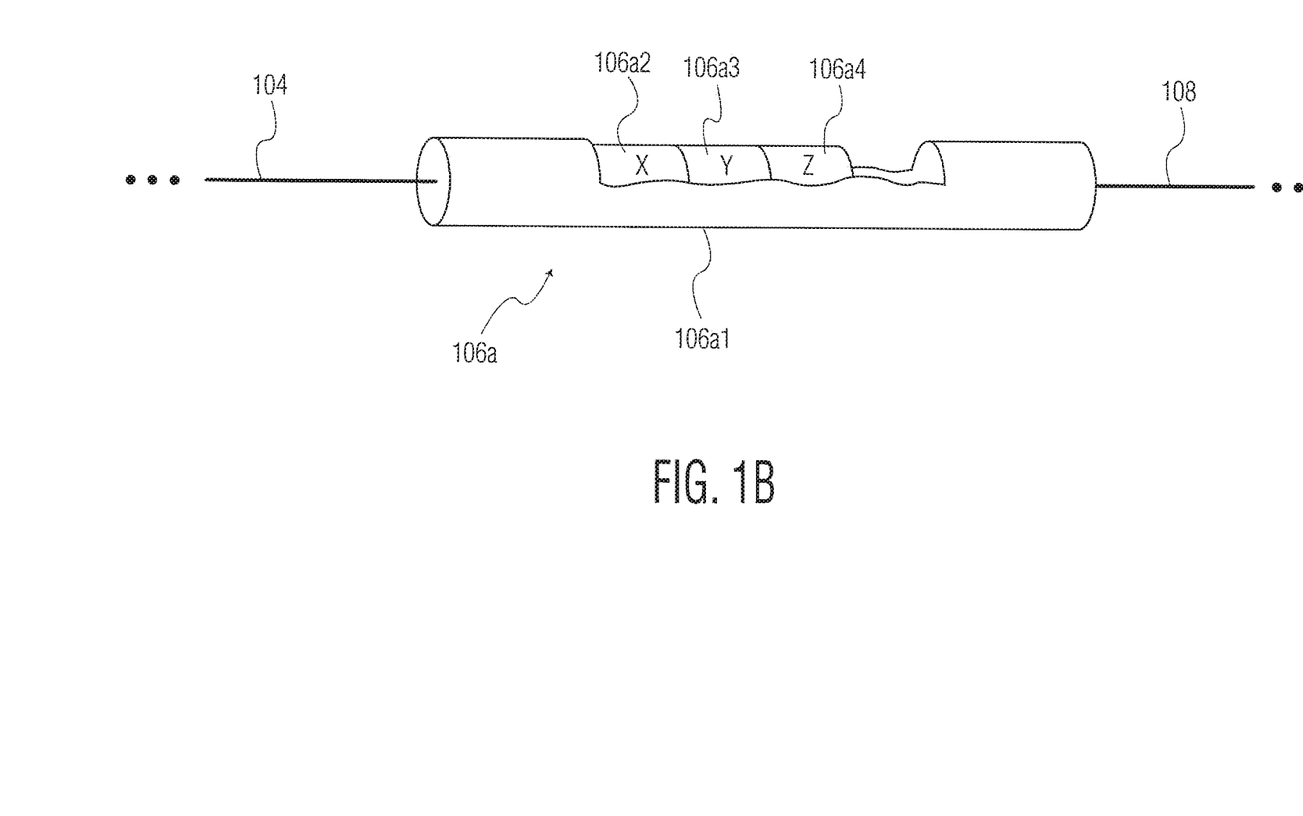
FIG. 1B is a block diagram of detailed portion of the fiber optic sensing system of FIG. 1A.

FIG. 1B illustrates details of an exemplary fiber optic sensing tool 106a (e.g., a fiber optic sensor assembly). Tool 106a includes a housing 106a1. Lead cable 104 (or another fiber optic cable) is optically coupled as an input to tool 106a, and interconnect fiber optic cable 108 is optically coupled as an output from tool 106a (leading to tool 106b). Within housing 106a1 are three (3) fiber optic sensors 106a2, 106a3, and 106a4. For example, each of sensors 106a2, 106a3, and 106a4 may be configured to sense mechanical or physical motion along a specific axis (e.g., as illustrated, sensor 106a2 is configured to sense along the x-axis, sensor 106a3 is configured to sense along the y-axis, and sensor 106a4 is configured to sense along the z-axis). As will be appreciated by those skilled in the art, the use of three (3) fiber optic sensors in tool 106a is exemplary in nature, and may be varied as desired in the specific application.

Figure 2:
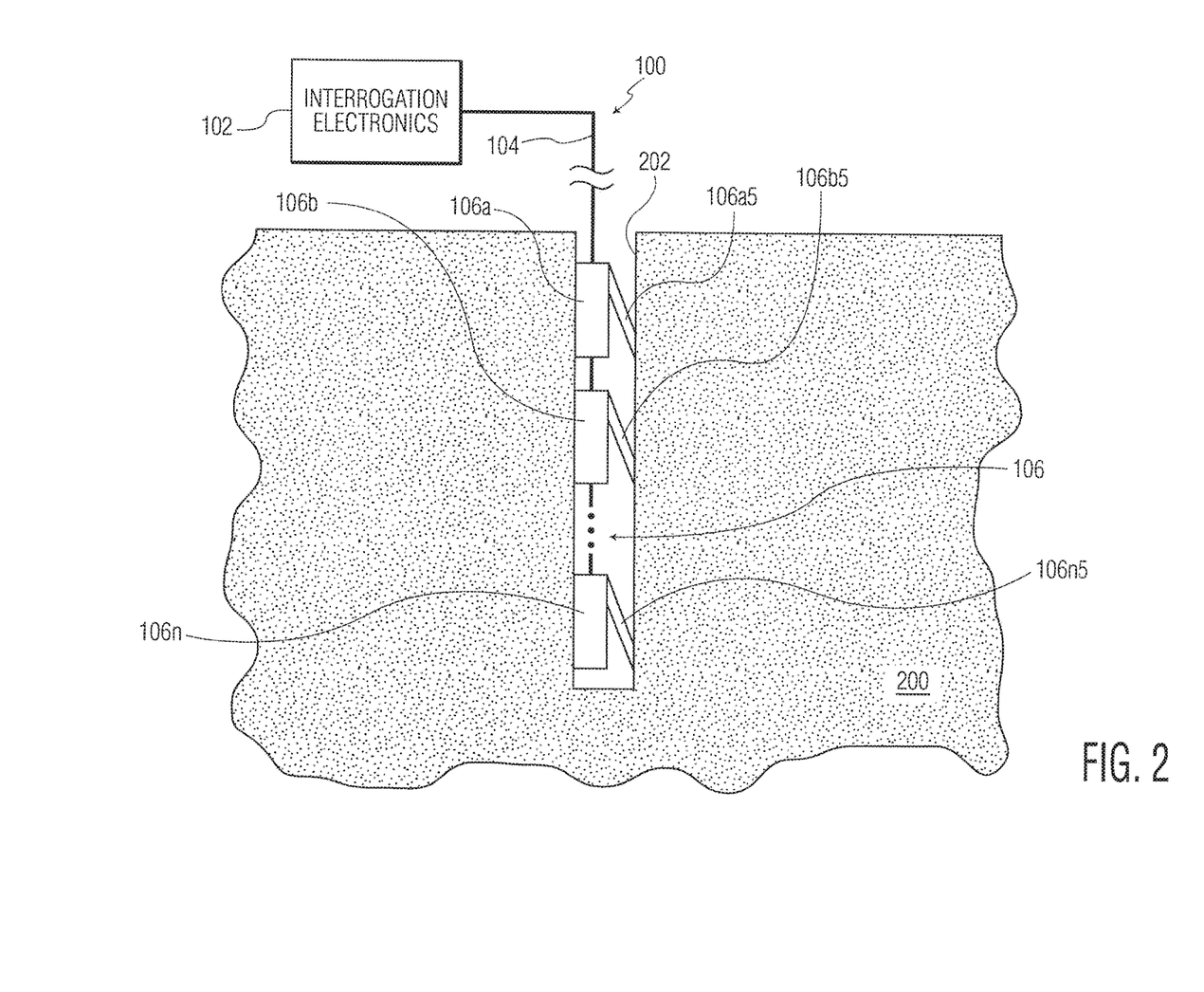
FIG. 2 is a block diagram of the fiber optic sensing system of FIG. 1A in a downhole application in accordance with an exemplary embodiment of the present invention.

FIG. 2 illustrates fiber optic sensing system 100 in a downhole application, for example, in an application configured to sense seismic information related to the oil and gas industry. In the example shown in FIG. 2, interrogation electronics 102 is above ground, while fiber optic sensing array 106 is disposed in a borehole 202 in the earth 200. Lead cable 104 optically connects interrogation electronics 102 to fiber optic sensing array 106. In the illustration of FIG. 2, each of tools 106a, 106b, . . . , 106n includes a respective clamping system including clamp arm 106a5, 106b5, . . . , 106n5. In FIG. 2, clamps arms 106a5, 106b5, . . . , 106n5 are in an extended position providing the respective tools in a substantially fixed position in borehole 202, pressed against a sidewall of borehole 202. Clamp arms 106a5, 106b5, . . . , 106n5 are configured to be operated between a retracted position (e.g., during lowering of array 106 into borehole 202, and removal of array 106 from borehole 202) and a extended position (as shown in FIG. 2) during sensing operations.

Figure 3:
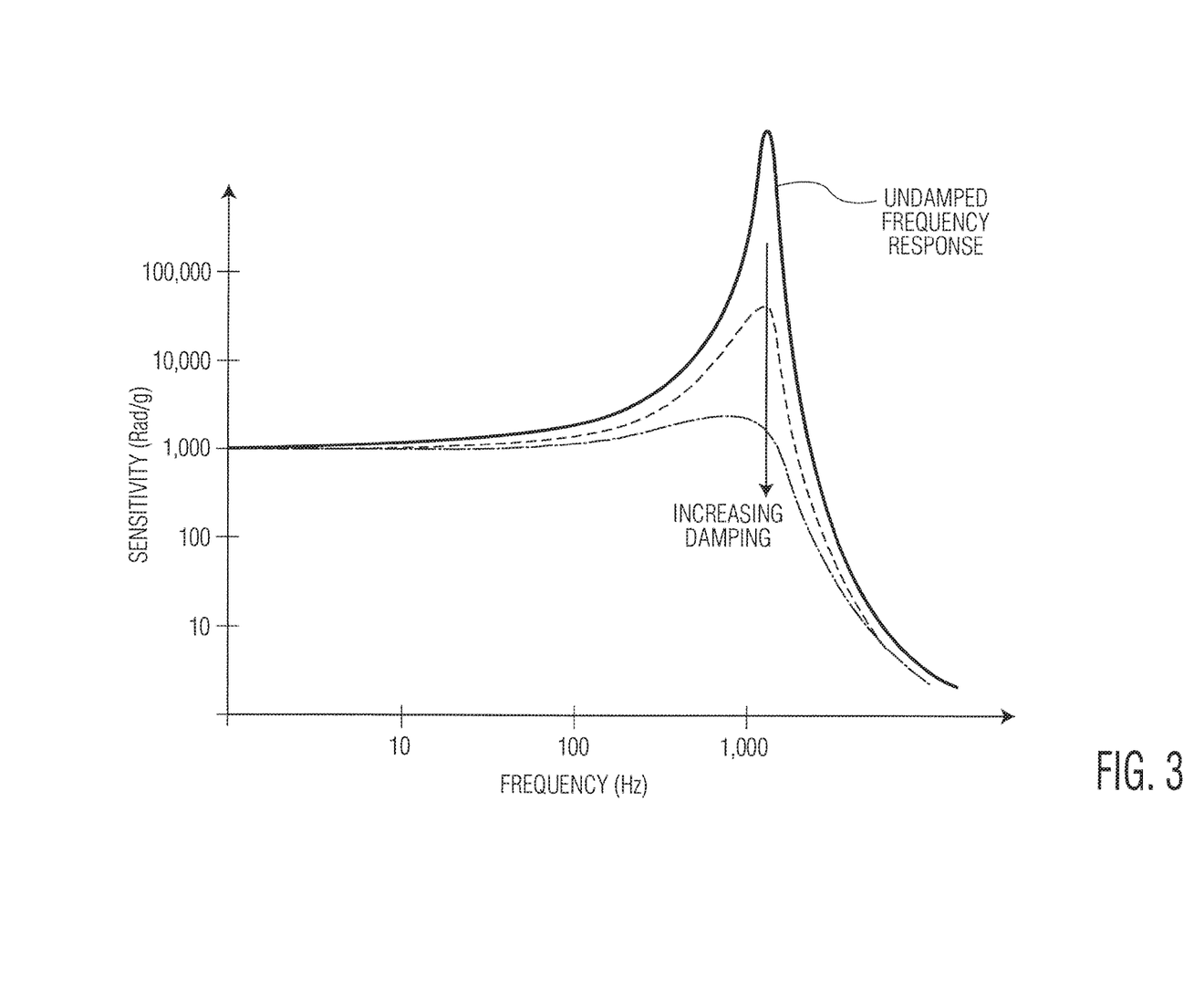
FIG. 3 is a graphical illustration of frequency responses of conventional and inventive fiber optic sensors in accordance with an exemplary embodiment of the present invention.

FIG. 3 illustrates a frequency response of various fiber optic sensors (e.g., fiber optic accelerometers). The upper curve (shown as a solid line) illustrates an example undamped mass-spring fiber optic sensor (accelerometer) with a relatively constant sensitivity (in rad/g) at lower frequencies. At the sensor's natural frequency, the mechanical resonance naturally causes the sensitivity to peak sharply which may result in a limited dynamic range.

As shown in the lower 2 curves in FIG. 3, by increasing the damping of the fiber optic sensor, the magnitude of the peak sensitivity decreases relative to the low frequency sensitivity, thereby providing a more constant frequency response and an improved dynamic range.

FIGS. 4A-4H illustrate various fiber optic accelerometers, and components of fiber optic accelerometers, in accordance with various exemplary embodiments of the present invention. Exemplary fiber optic accelerometers are disclosed in U.S. Patent Application Publication No. 2012/0257208, titled "FIBER OPTIC TRANSDUCERS, FIBER OPTIC ACCELEROMETERS AND FIBER OPTIC SENSING SYSTEMS", which is hereby incorporated by reference in its entirety.

Elements having the same reference numerals in the drawings shall be considered to be same element described throughout the present application unless specified otherwise.

Figure 4A:
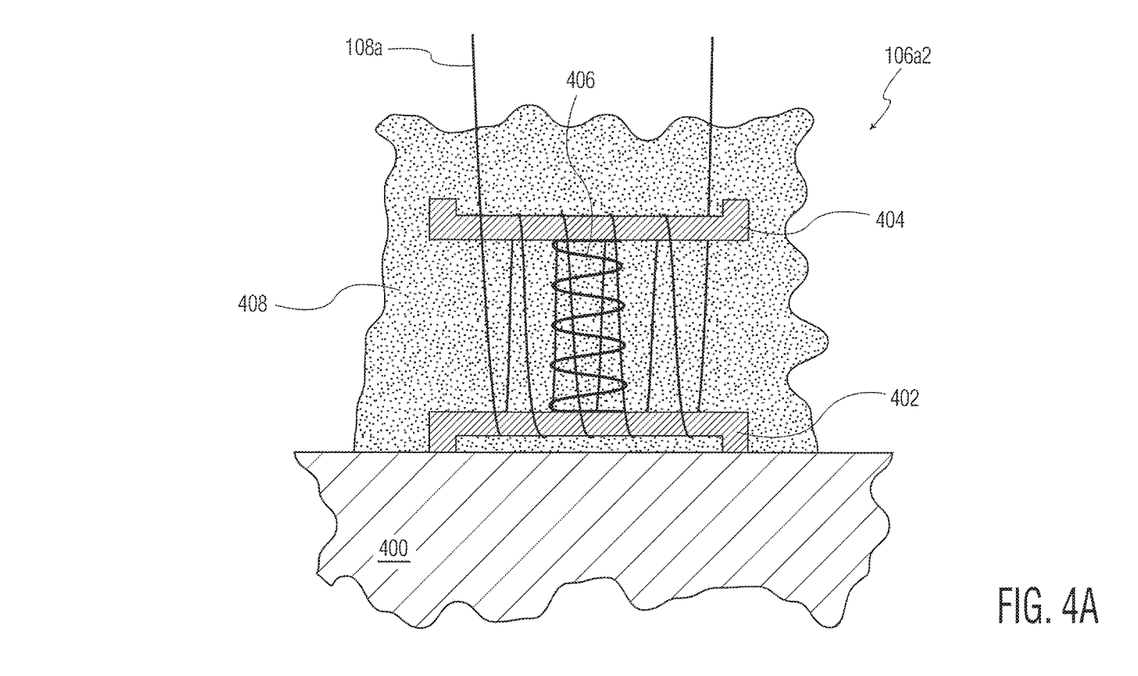
FIGS. 4A-4H are block diagram illustrations of various fiber optic accelerometers, and components of fiber optic accelerometers, in accordance with various exemplary embodiments of the present invention.

Referring specifically to FIG. 4A, a fiber optic sensor 106a2 (e.g., an accelerometer) is secured to a body of interest 400. Fiber optic sensor 106a2 includes a fixed portion 402 secured to body of interest 400, a moveable portion 404 that moves along at least one axis (within a range of motion) with respect to fixed portion 402, and a spring member 406 positioned between fixed portion 402 and moveable portion 404. An optical fiber 108a (e.g., an optical fiber from fiber optic cable 108 shown in FIG. 1B) is wound around and between fixed portion 402 and moveable portion 404 such that optical fiber 108a spans spring member 406. The ends of optical fiber 108a are optically connected (e.g., through fiber optic cable 108, lead cable 104, other fiber optic components comprising an interferometer, etc.) to interrogation electronics 102 shown in FIG. 1 such that optical signals may be received at fiber optic sensor 106a2 from an optical source in interrogation electronics 102.

Elastomeric material 408 is provided in contact with various elements of fiber optic sensor 106a2a. In fact, in FIG. 4A, elastomeric material 408 surrounds all (or at least a portion of) fiber optic sensor 106a2 (and the various elements included in fiber optic sensor 106a2). This has a damping effect on fiber optic sensor 106a2, thereby improving it's dynamic range, amongst other benefits.

Figure 4B:
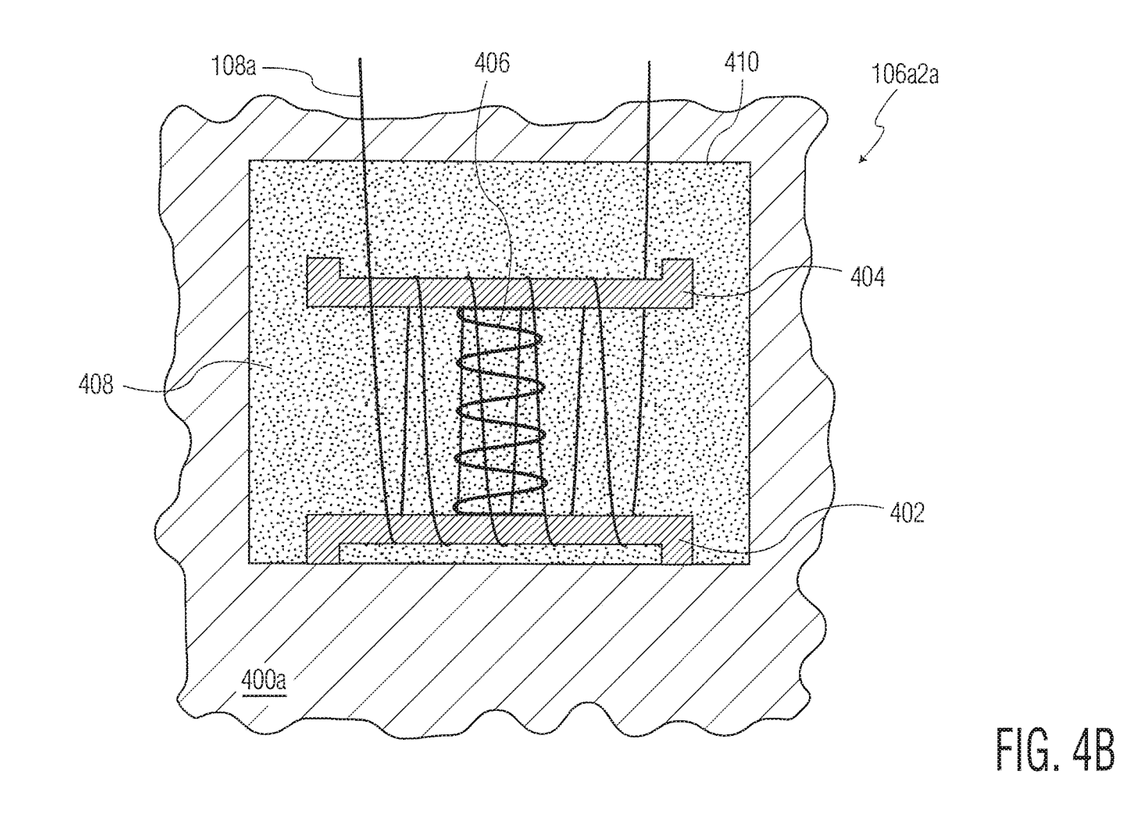

FIG. 4B illustrates the same elements as in FIG. 4A, except that fiber optic sensor 106a2a is provided within a cavity 410 of body of interest 400. As shown, with fiber optic sensor 106a2a provided in cavity 410, substantially all of the remaining open area within cavity 410 is filled with elastomeric material 408—such that elastomeric material 408 surrounds and is attached to all (or at least a portion of) fiber optic sensor 106a2a.

Figure 4C:
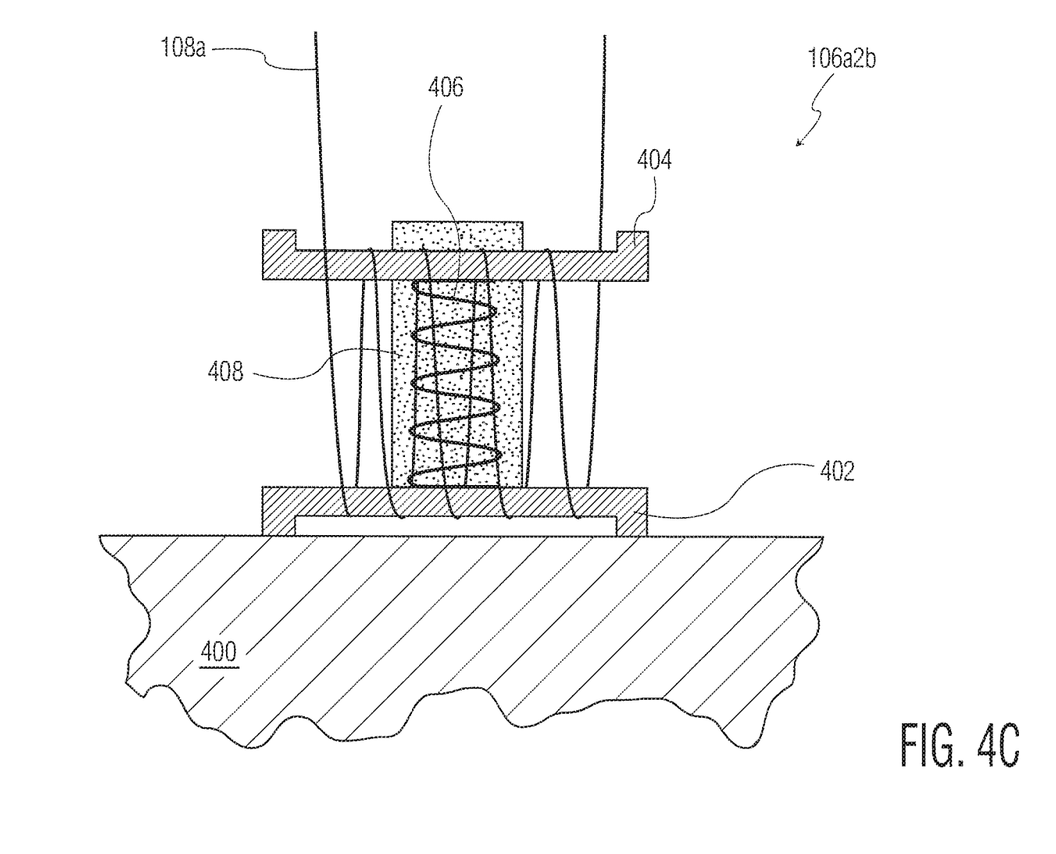

FIG. 4C illustrates the same elements as in FIG. 4A, except that in fiber optic sensor 106a2b elastomeric material 408 is provided in a reduced volume, to surround spring member 406—and to be in contact with fixed portion 402, moveable portion 404, and optical fiber 108a.

Figure 4D:
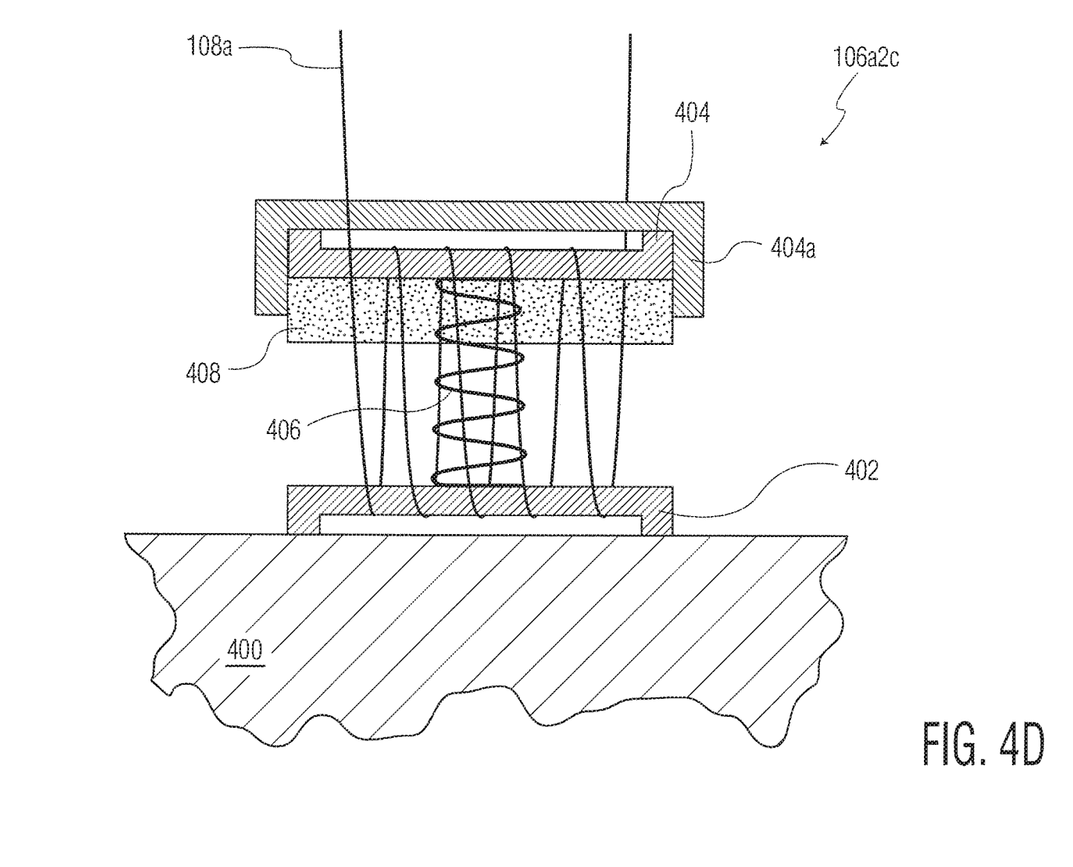

FIG. 4D illustrates the same elements as in FIG. 4A, except that: an additional mass 404a is engaged with (e.g., connected to) moveable portion 404; and elastomeric material 408 is provided in a reduced area, to be in contact with a portion of spring member 406, moveable portion 404, optical fiber 108a, and mass 404a. Mass 404a moves with moveable portion 404 along the motion axis (or axes) of moveable portion 404, and may be provided to increase the sensitivity of fiber optic sensor 106a2c.

Figure 4E:
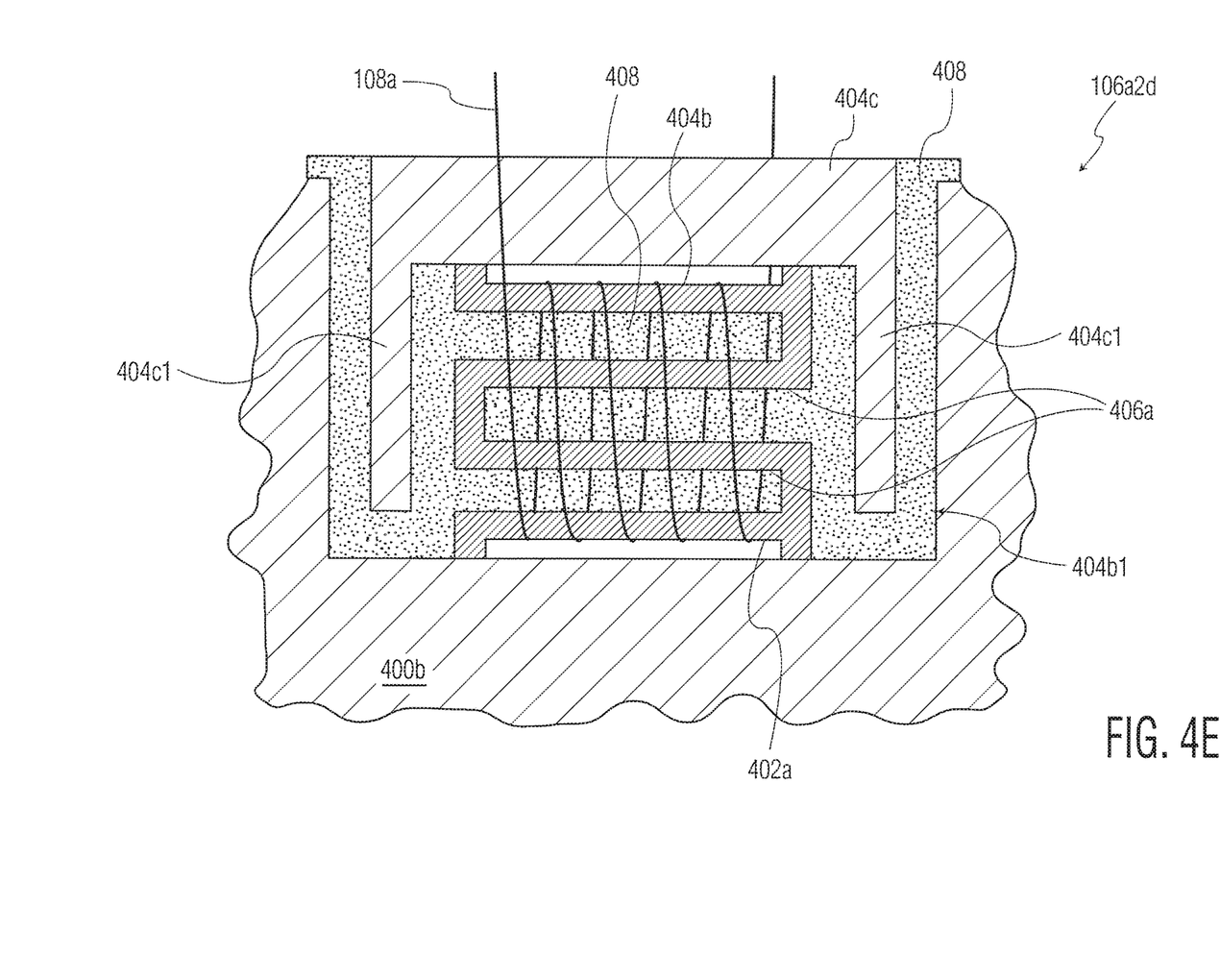
Figure 4F:
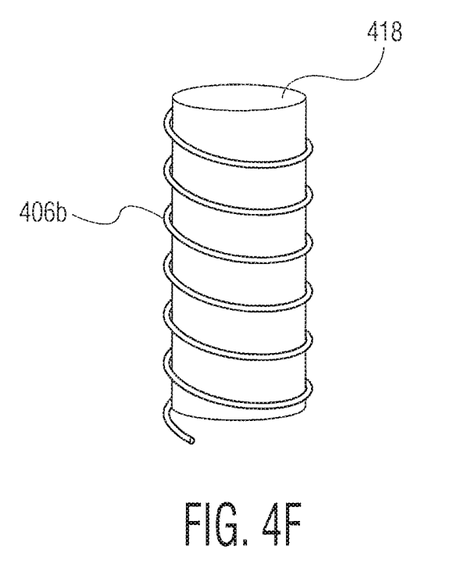
Figure 4G:
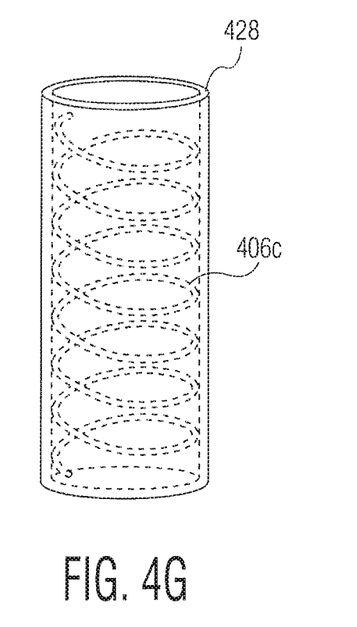

FIG. 4E illustrates similar elements as in FIG. 4A. However, in FIG. 4E fiber optic sensor 106a2d includes a fixed portion 402a, spring member 406a, and moveable portion 404b formed from a unitary piece of material. Further, an additional mass 404c is provided engaged with (e.g., connected to) moveable portion 404b, and includes side wall portions 404c1 at least partially surrounding at least one of spring member 406a, the fixed portion 402a, and other elements of fiber optic sensor 106a2d as shown in FIG. 4E, during at least one position within the range of motion of moveable portion 404b. Further still, body of interest 400b defines cavity 404b1. Fiber optic sensor 106a2d is positioned at least partially within cavity 400b1. Elastomeric material 408 is provided in an open area within cavity 400b1 (and perhaps filling the open area of cavity 400b1) such that elastomeric material 408 surrounds and is attached to all (or at least a portion of) fiber optic sensor 106a2d.

In each of FIGS. 4A-4E, elastomeric material 408 is provided as a fluid material applied to the desired volume of the respective fiber optic sensor. This fluid material cures, providing the desired elastomeric (damping) effect. However, in accordance with certain exemplary embodiments of the present invention, solid elastomeric materials may be applied (e.g., positioned) in connection with the respective fiber optic sensor. For example, in FIG. 4F, a solid core elastomeric member 418 (e.g., a rubber rod) is provided within and may be attached to a spring member 406b. In another example in FIG. 4G, a spring member 406c is provided within and may be attached to a hollow elastomeric member 428 (e.g., a rubber tube). In either case, the combined spring member and elastomeric member may be included in a fiber optic sensor (e.g., such as the sensors illustrated and described in connection with FIGS. 4A-4D), taking the place of spring members 406 and elastomeric material 408.

Figure 4H:
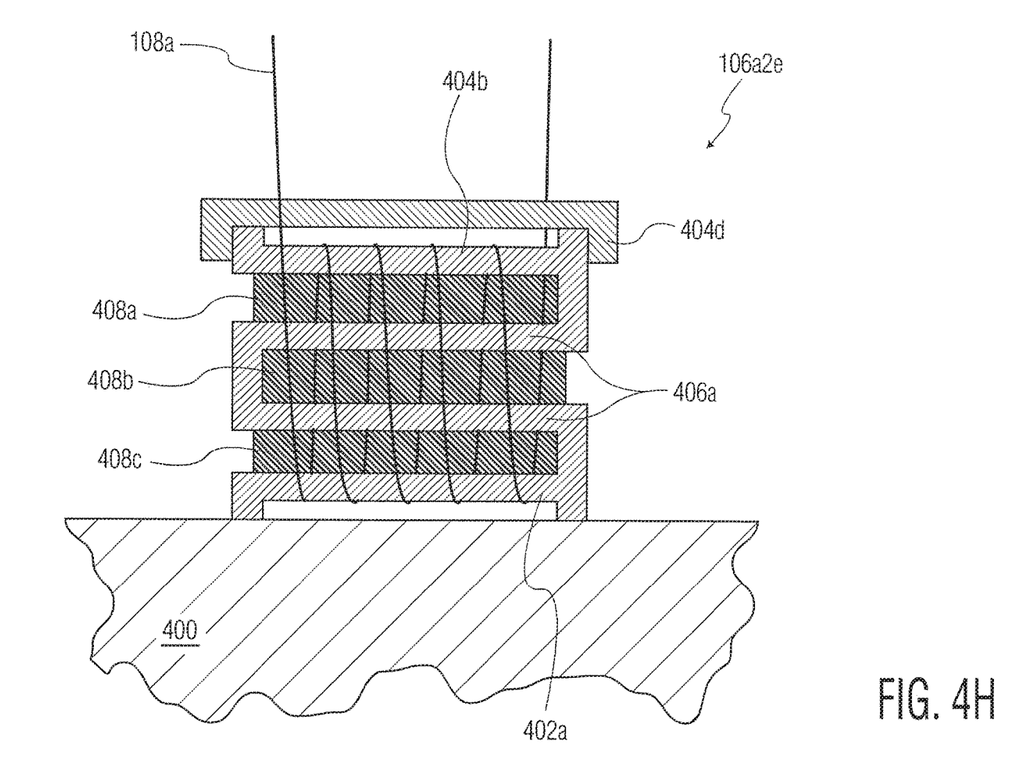

FIG. 4H illustrates an exemplary fiber optic sensor 106a2e secured to a body of interest 400. Fiber optic sensor 106a2e includes a combined fixed portion 402a, spring member 406a, and moveable portion 404b formed from a unitary piece of material as in FIG. 4E. Further, an additional mass 404d is provided engaged with (e.g., connected to) moveable portion 404b. In FIG. 4H, solid elastomeric material elements 408a, 408b, and 408c (e.g., rubber members, such as shims) are provided in between ones of the fixed portion 402a, spring member 406a, and moveable portion 404b to provide the desired damping function.

According to certain exemplary embodiments of the present invention, methods of assembling fiber optic accelerometers/sensors and sensor assemblies (including a housing, as in FIG. 1B) are provided. As will be appreciated by those skilled in the art, certain steps included in the methods described below may be omitted; certain additional steps may be added; and the order of the steps may be altered from the order described.

In an example where the fixed portion, the spring member, and the moveable portion of an accelerometer are formed from a unitary piece of material, and the elastomeric material is applied as a fluid (such as in FIG. 4E), an example assembly method includes: (1) providing the unitary piece of material including a fixed portion, a moveable mandrel and a spring member therebetween; (2) winding a single length of optical fiber between (and around) the fixed portion and the moveable portion; (3) optionally attaching a proof mass to the moveable portion; (4) applying (e.g., using a syringe) a fluid elastomeric material (e.g., a liquid resin) in selected volumes/areas between elements of the accelerometer such as between ones of the moveable portion, the spring member, the wound optical fiber, and the proof mass; (5) curing and/or vulcanizing the elastomeric material to become a flexible, solid elastomer (e.g., depending upon the fluid elastomeric material used, some form of energy may be used in the curing process such as heat, light, a combination of heat and force, etc.); and (6) attaching the accelerometer to the body of interest.

In an example where the fixed portion, the spring member, and the moveable portion of an accelerometer are formed from a unitary piece of material, and the elastomeric material is applied as a solid (such as in FIG. 4H), an example assembly method includes: (1) providing the unitary piece of material including a fixed portion, a moveable mandrel and a spring member therebetween; (2) inserting one or more flexible, solid elastomeric elements in gaps between structural elements of the unitary piece of material; (3) winding a single length of optical fiber between (and around) the fixed portion and the moveable portion; (3) optionally attaching a proof mass to the moveable portion; (4) attaching the accelerometer to the body of interest.

In an example where the fixed portion, the spring member, and the moveable portion of an accelerometer are separate elements, and the elastomeric material is applied as a fluid (such as in FIGS. 4A-4D), an example assembly method includes: (1) providing a fixed portion, a moveable mandrel and a spring member therebetween; (2) winding a single length of optical fiber between (and around) the fixed portion and the moveable portion; (3) optionally attaching a proof mass to the moveable portion; (4) applying (e.g., using a syringe) a fluid elastomeric material (e.g., a liquid resin) in selected volumes/areas between elements of the accelerometer such as between ones of the moveable portion, the spring member, the wound optical fiber, and the proof mass; (5) curing and/or vulcanizing the elastomeric material to become a flexible, solid elastomer (e.g., depending upon the fluid elastomeric material used, some form of energy may be used in the curing process such as heat, light, a combination of heat and force, etc.); and (6) attaching the accelerometer to the body of interest.

In an example where the fixed portion, the spring member, and the moveable portion of an accelerometer are separate elements, and the elastomeric material is applied as a solid (such as accelerometers including the elements shown in FIGS. 4F-4G), an example assembly method includes: (1) providing a fixed portion, a moveable mandrel and a spring member therebetween; (2) inserting one or more solid elastomeric elements in spaces/gaps/areas between elements of the accelromter such as between the spring member and another element of the accelerometer; (3) winding a single length of optical fiber between (and around) the fixed portion and the moveable portion; (4) optionally attaching a proof mass to the moveable portion; (5) attaching the accelerometer to the body of interest.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of assembling a fiber optic sensor, the method comprising the steps of:

(a) providing a fixed portion configured to be secured to a body of interest, a moveable portion, a spring member positioned at least partially between the fixed portion and the moveable portion, and an optical fiber wound in contact with the fixed portion and the moveable portion such that the optical fiber spans at least a portion of the spring; and (b) providing an elastomeric material to be in contact with at least one of the fixed portion, the moveable portion, the spring member, the body of interest, or the optical fiber, wherein step (b) includes applying the elastomeric material as a fluid to surround each of the moveable portion and the spring.

2. The method of claim 1 wherein the elastomeric material provided in step (b) includes a material selected from the group consisting of rubbers, neoprenes, urethanes, epoxies, silicones and viscoelastic materials.

3. The method of claim 1 wherein the elastomeric material is a viscoelastic material.

* * * * *